United States Patent
Jin et al.

(10) Patent No.: US 12,368,160 B2
(45) Date of Patent: Jul. 22, 2025

(54) POSITIVE ELECTRODE FOR LITHIUM SECONDARY BATTERY AND LITHIUM SECONDARY BATTERY INCLUDING THE SAME

(71) Applicant: LG Chem, Ltd., Seoul (KR)

(72) Inventors: Joo Hong Jin, Daejeon (KR); Min Kyu You, Daejeon (KR); Sun Sik Shin, Daejeon (KR); Kyung Lok Lee, Daejeon (KR); Ji A Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 591 days.

(21) Appl. No.: 17/427,815

(22) PCT Filed: Aug. 11, 2020

(86) PCT No.: PCT/KR2020/010632
§ 371 (c)(1),
(2) Date: Aug. 2, 2021

(87) PCT Pub. No.: WO2021/029652
PCT Pub. Date: Feb. 18, 2021

(65) Prior Publication Data
US 2022/0140320 A1   May 5, 2022

(30) Foreign Application Priority Data
Aug. 12, 2019   (KR) .......................... 10-2019-0098426

(51) Int. Cl.
*H01M 4/36*   (2006.01)
*H01M 4/131*  (2010.01)
(Continued)

(52) U.S. Cl.
CPC .......... *H01M 4/366* (2013.01); *H01M 4/131* (2013.01); *H01M 4/364* (2013.01); *H01M 4/505* (2013.01);
(Continued)

(58) Field of Classification Search
CPC ...... H01M 4/131; H01M 4/366; H01M 4/364; H01M 4/505; H01M 4/525; H01M 10/052; H01M 2004/021; H01M 2004/028
See application file for complete search history.

(56) References Cited

U.S. PATENT DOCUMENTS

2006/0257745 A1*  11/2006  Choi .................... H01M 4/525
429/223
2012/0202113 A1   8/2012   Hodge et al.
(Continued)

FOREIGN PATENT DOCUMENTS

JP   2005135691 A  *  5/2005
JP   2018041675 A     3/2018
(Continued)

OTHER PUBLICATIONS

EPO machine generated English translation of WO-2017150949-A1 (Year: 2017).*
(Continued)

*Primary Examiner* — Basia A Ridley
*Assistant Examiner* — Kimberly Wyluda
(74) *Attorney, Agent, or Firm* — Lerner David LLP (57) ABSTRACT

A positive electrode includes: a positive electrode active material layer formed on a surface of a positive electrode current collector, including two types of positive electrode active materials with different average particle diameters ($D_{50}$), a conductive material, and a binder; and a carbon nanotube coating layer formed on a surface of the positive electrode active material layer, including carbon nanotubes and a binder: The two types of positive electrode active materials include first positive electrode active material particles which have an average particle diameter ($D_{50}$) of 8 μm to 20 μm and second positive electrode active material particles in the form of a single particle which have a smaller (Continued)

average particle diameter ($D_{50}$) than the average particle diameter ($D_{50}$) of the first positive electrode active material particles, and the positive electrode active material layer and the carbon nanotube coating layer are formed in a thickness ratio of 90:10 to 99:1.

6 Claims, 5 Drawing Sheets (51) Int. Cl.
*H01M 4/505* (2010.01)
*H01M 4/525* (2010.01)
*H01M 4/62* (2006.01)
*H01M 10/052* (2010.01)
*H01M 4/02* (2006.01)

(52) U.S. Cl.
CPC ........... *H01M 4/525* (2013.01); *H01M 4/625* (2013.01); *H01M 2004/021* (2013.01); *H01M 2004/028* (2013.01); *H01M 4/623* (2013.01); *H01M 10/052* (2013.01)

(56) References Cited

U.S. PATENT DOCUMENTS

| | | |
|---|---|---|
| 2012/0308891 A1 | 12/2012 | Todoriki et al. |
| 2013/0164622 A1 | 6/2013 | Park et al. |
| 2015/0228973 A1 | 8/2015 | Won et al. |
| 2016/0156018 A1 | 6/2016 | Kim |
| 2016/0254536 A1* | 9/2016 | Hiratsuka ............. H01M 4/366 429/223 |
| 2016/0308192 A1 | 10/2016 | Lee et al. |
| 2018/0241036 A1 | 8/2018 | Jo et al. |
| 2018/0248195 A1 | 8/2018 | Choi et al. |
| 2019/0027755 A1 | 1/2019 | You et al. |
| 2019/0319257 A1* | 10/2019 | Ogawa ................. H01M 4/525 |
| 2020/0295367 A1 | 9/2020 | Yoo et al. |
| 2020/0388830 A1 | 12/2020 | Lee et al. |
| 2023/0163295 A1 | 5/2023 | Yoo et al. |
| 2023/0352678 A1 | 11/2023 | Yoo et al. |

FOREIGN PATENT DOCUMENTS

| | | |
|---|---|---|
| KR | 20130073810 A | 7/2013 |
| KR | 20130124610 A | 11/2013 |
| KR | 20140012008 A | 1/2014 |
| KR | 20140098347 A | 8/2014 |
| KR | 20150093539 A | 8/2015 |
| KR | 20160065282 A | 6/2016 |
| KR | 20160123839 A | 10/2016 |
| KR | 20170063373 A | 6/2017 |
| KR | 20170133188 A | 12/2017 |
| KR | 20180045802 A | 5/2018 |
| KR | 101938237 B1 | 1/2019 |
| KR | 20190041715 A | 4/2019 |
| KR | 20190044690 A | 4/2019 |
| KR | 20190059241 A | 5/2019 |
| KR | 20190093453 A | 8/2019 |
| WO | 2017057078 A1 | 4/2017 |
| WO | WO-2017150949 A1 * | 9/2017 ............ C01G 53/42 |
| WO | 2019151834 A1 | 8/2019 |

OTHER PUBLICATIONS

EPO English translation of JP-2005135691-A (Year: 2005).*
International Search Report for PCT/KR2020/010632 mailed Nov. 17, 2020, 2 pgs.
Search Report dated Dec. 8, 2023 from the Office Action for Chinese Application No. 202080012191.7 issued Dec. 12, 2023, 2 pages.

* cited by examiner

POSITIVE ELECTRODE FOR LITHIUM SECONDARY BATTERY AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2020/010632, filed on Aug. 11, 2020, which claims priority to Korean Patent Application No. 10-2019-0098426, filed on Aug. 12, 2019, the disclosure of which are incorporated herein by reference in its entirety.

TECHNICAL FIELD

The present invention relates to a positive electrode for a lithium secondary battery and a lithium secondary battery including the positive electrode for a lithium secondary battery.

BACKGROUND ART

As the technology for mobile devices is developed and the demand for mobile devices increases, the demand for secondary batteries as an energy source is rapidly increasing. Among secondary batteries, lithium secondary batteries having high energy density, a high voltage, a long cycle lifespan, and a low self-discharge rate have been commercialized and widely used.

Lithium-transition metal composite oxides have been used as a positive electrode active material for a lithium secondary battery, and among lithium-transition metal composite oxides, $LiCoO_2$, which is a lithium-cobalt composite metal oxide having a high operating voltage and excellent capacity characteristics, has been mainly used. However, since $LiCoO_2$ not only has very poor thermal properties due to the destabilization of its crystal structure resulting from lithium deintercalation but also is expensive, it has a limitation in mass use as a power source in the electric vehicle field and the like.

As a material for replacing $LiCoO_2$, lithium-manganese composite metal oxides ($LiMnO_2$, $LiMn_2O_4$, etc.), lithium-iron phosphate oxides ($LiFePO_4$, etc.), lithium-nickel composite metal oxides ($LiNiO_2$, etc.), and the like have been developed. Among them, lithium-nickel composite metal oxides, which have a high reversible capacity of about 200 mAh/g and thus facilitate the implementation of large-capacity batteries, have been actively researched and developed. However, $LiNiO_2$ has inferior thermal stability compared to $LiCoO_2$ and causes a battery to fracture and ignite because the positive electrode active material itself is decomposed when an internal short circuit occurs in a charged state due to pressure applied from the outside. Accordingly, as a method for improving the low thermal stability of $LiNiO_2$ while maintaining the excellent reversible capacity thereof, lithium-nickel-cobalt metal oxides, in which a part of the nickel (Ni) is substituted with cobalt (Co) and metal elements (M) (here, M is at least one of Mn and Al), have been developed.

However, in the case of the lithium-nickel-cobalt metal oxides, the rolling density of particles is low, and particularly, when the Ni content increases to increase capacity characteristics, the rolling density of particles is further lowered. Also, when an electrode is strongly roll-pressed to increase rolling density, a current collector is fractured, and a positive electrode material is cracked.

In particular, the lithium-nickel-cobalt metal oxides made by general methods are in the form of a spherical secondary particle formed by agglomerating at least several tens of primary particles, and such a positive electrode active material in the form of a secondary particle has problems such as the above-described cracking and lifespan deterioration, gas generation, and the like which are caused by the cracking.

In order to address the above-described problems, a method of applying a positive electrode active material in the form a single particle having higher particle hardness than that of a secondary particle has been researched. However, when the positive electrode active material in the form of a single particle is applied to manufacture a secondary battery, the output characteristics of the battery are degraded.

Therefore, there is a need for the development of a secondary battery which not only allows the suppression of the cracking of a positive electrode active material but also achieves the prevention of performance deterioration and the improvement of output characteristics when the positive electrode active material is applied thereto.

PRIOR-ART DOCUMENTS

Patent Documents (Patent Document 1) Korean Laid-Open Patent Publication No. 10-2015-0093539

DISCLOSURE

Technical Problem

In order to address the above-described problems, the present invention is directed to providing a positive electrode for a lithium secondary battery which allows the cracking of a positive electrode material to be suppressed in addition to the improvement of output characteristics when applied to a battery.

The present invention is also directed to providing a lithium secondary battery including the positive electrode.

Technical Solution

One aspect of the present invention provides a positive electrode which includes: a positive electrode active material layer formed on a surface of a positive electrode current collector and including two types of positive electrode active materials with different average particle diameters ($D_{50}$), a conductive material, and a binder; and a carbon nanotube coating layer formed on a surface of the positive electrode active material layer and including carbon nanotubes and a binder, wherein the two types of positive electrode active materials with different average particle diameters include first positive electrode active material particles which have an average particle diameter ($D_{50}$) of 8 μm to 20 μm and second positive electrode active material particles in the form of a single particle which have a smaller average particle diameter ($D_{50}$) than the average particle diameter ($D_{50}$) of the first positive electrode active material particles, and the positive electrode active material layer and the carbon nanotube coating layer are formed in a thickness ratio of 90:10 to 99:1.

Another aspect of the present invention provides a lithium secondary battery including the positive electrode.

Advantageous Effects

According to the present invention, since a mixture of two types of positive electrode active materials with different average particle diameters is used, small-particle-diameter positive electrode active material particles having a relatively small average particle diameter fill the empty space between large-particle-diameter positive electrode active material particles having a relatively large average particle diameter. In this case, the small-particle-diameter positive electrode active material particles act to absorb impact, and thus the cracking of the large-particle-diameter positive electrode active material particles can be prevented. Also, since the empty space between positive electrode active material particles is minimized, energy density is improved, and thus a secondary battery with high capacity can be provided. In addition, since the positive electrode active material having a relatively small particle diameter is in the form of a single particle, the cracking of the positive electrode active material can be more effectively prevented.

In addition, since a carbon nanotube coating layer is formed on the surface of a positive electrode active material layer, the cracking of positive electrode active materials, which may occur in the manufacture of a secondary battery or in charging and discharging after the manufacture of a secondary battery, can be further prevented. Also, the conductivity of a positive electrode is improved, and thus when the positive electrode is applied to a battery, a secondary battery with improved output characteristics can be provided.

MODES OF THE INVENTION

Hereinafter, the present invention will be described in more detail.

Terms and words used in this specification and the claims should not be interpreted as limited to commonly used meanings or meanings in dictionaries and should be interpreted with meanings and concepts which are consistent with the technological scope of the present invention based on the principle that the inventors can appropriately define concepts of terms in order to describe the invention in the best way.

In this specification, a "positive electrode active material particle in the form of a single particle" is a concept in contrast to a positive electrode active material particle in the form of a spherical secondary particle formed by agglomerating several tens to several hundreds of primary particles using a conventional method, and means a positive electrode active material particle formed of at most ten primary particles. Specifically, the positive electrode active material particle in the form of a single particle used herein may be in the form of a single particle formed of one primary particle or in the form of a secondary particle formed by agglomerating several primary particles.

In this specification, a "primary particle" means the smallest unit of particles recognized when positive electrode active material particles are observed through a scanning electron microscope, and a "secondary particle" means a secondary structure formed by agglomerating a plurality of primary particles.

In this specification, the average particle diameter ($D_{50}$) of positive electrode active material particles may be defined as a particle diameter corresponding to 50% of the cumulative volume in a particle diameter distribution curve. The average particle diameter ($D_{50}$) may be measured using, for example, a laser diffraction method. The laser diffraction method generally allows the measurement of a particle diameter ranging from a submicron level to several millimeters and may produce a result having high reproducibility and high resolution.

In the present invention, the average particle diameter of primary particles is a value obtained by actually measuring the particle diameter of individual primary particles using SEM data for the cross section of a positive electrode active material and then averaging the measurements.

In the present invention, a "crystalline grain" means a single crystalline grain unit having a regular atomic arrangement. In the present invention, the size of the crystalline grain is a value obtained by obtaining X-ray diffraction (XRD) data and then analyzing the data through Rietveld refinement.

Positive Electrode

Lithium-nickel-cobalt metal oxides conventionally used as a positive electrode material for a lithium secondary battery have a problem such as low rolling density of particles. When an electrode is strongly roll-pressed to increase rolling density, there are problems in that a current collector is fractured, and a positive electrode material is cracked.

Accordingly, the present inventors have ardently conducted research to develop a positive electrode material with excellent rolling density and found that, by including two types of positive electrode active materials with different average particle diameters, wherein a positive electrode active material having a relatively small average particle diameter is in the form of a single particle, and thus the cracking of the positive electrode material may be effectively improved during roll pressing, and by forming a carbon nanotube coating layer on the surface of a positive electrode active material layer including the positive electrode material, the carbon nanotube coating layer acts as an impact-absorbing layer so as to not only further suppress the cracking of the positive electrode material but also effectively improve output characteristics. Based on the facts, the present invention has been completed.

This will be described in further detail. A positive electrode according to the present invention includes: a positive electrode active material layer formed on a surface of a positive electrode current collector and including two types of positive electrode active materials with different average particle diameters ($D_{50}$), a conductive material, and a binder; and a carbon nanotube coating layer formed on a surface of the positive electrode active material layer, wherein the two types of positive electrode active materials with different average particle diameters include first positive electrode active material particles which have an average particle diameter ($D_{50}$) of 8 μm to 20 μm and second positive electrode active material particles in the form of a single particle which have a smaller average particle diameter ($D_{50}$) than the average particle diameter ($D_{50}$) of the first positive electrode active material particles, and the positive electrode active material layer and the carbon nanotube coating layer are formed in a thickness ratio of 90:10 to 99:1.

Hereinafter, the positive electrode for a lithium secondary battery according to the present invention will be described in more detail.

Figure 1:
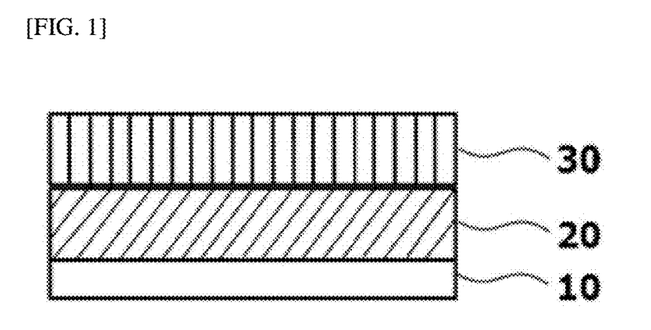
FIG. 1 is a schematic diagram of a positive electrode according to the present invention.

First, as shown in FIG. 1, the positive electrode according to the present invention includes a positive electrode active material layer 20 formed on a positive electrode current collector 10 and a carbon nanotube coating layer 30 formed on the positive electrode active material layer 20.

The positive electrode current collector 10 is not particularly limited as long as it does not cause a chemical change in the battery and has conductivity. For example, stainless steel, aluminum, nickel, titanium, calcined carbon, aluminum or stainless steel whose surface has been treated with carbon, nickel, titanium, silver, or the like, or the like may be used as the positive electrode current collector. In addition, the positive electrode current collector may typically have a thickness of 3 μm to 500 μm and have fine irregularities formed on the surface thereof to increase the adhesion of a positive electrode active material. Additionally, the positive electrode current collector may be used in any of various forms such as a film, a sheet, a foil, a net, a porous material, a foam, a non-woven fabric, and the like.

In addition, the positive electrode active material layer 20 formed on the positive electrode current collector 10 includes two types of positive electrode active materials with different average particle diameters, a conductive material, and a binder.

The two types of positive electrode active materials with different average particle diameters ($D_{50}$) may each be represented by the following Chemical Formula 1.

$$Li_{1+a}Ni_xCo_yM_zO_2 \quad \text{[Chemical Formula 1]}$$

In Chemical Formula 1, 0≤a≤0.5, 0<x<1, 0<y<1, 0<z<1, and M is at least one of Mn and Al, and preferably, 0≤a<0.2, 0.5≤x≤1, 0≤y≤0.5, 0≤z≤0.5, and M is Mn.

The two types of positive electrode active materials with different average particle diameters ($D_{50}$) according to the present invention may have a bimodal particle diameter distribution, including first positive electrode active material particles which have an average particle diameter ($D_{50}$) of 8 μm to 20 μm and second positive electrode active material particles in the form of a single particle which have a smaller average particle diameter ($D_{50}$) than the average particle diameter ($D_{50}$) of the first positive electrode active material particles.

For example, the two types of positive electrode active materials with different average particle diameters ($D_{50}$) may have a bimodal particle diameter distribution, in which the first positive electrode active material has an average particle diameter ($D_{50}$) of 8 μm to 20 μm, and preferably, 10 μm to 15 μm, and the second positive electrode active material has an average particle diameter ($D_{50}$) of 1 μm or more and less than 8 μm, and preferably, 3 μm to 6 μm.

When the average particle diameter of the first positive electrode active material is out of the above-described range, an impact absorption effect is decreased, and thus the first positive electrode active material may be cracked during roll pressing. In addition, when the average particle diameter ($D_{50}$) of the second positive electrode active material is out of the above-described range, a bimodal effect is decreased, and thus a desired rolling density may not be achieved.

For example, the positive electrode material may be in the form in which small-particle-diameter second positive electrode active material particles having a relatively small average particle diameter ($D_{50}$) fill the empty space between large-particle-diameter first positive electrode active material particles having a relatively large average particle diameter ($D_{50}$). When the second positive electrode active material particles fill the empty space between the first positive electrode active material particles, the second positive electrode active material particles act to absorb impact and may be first cracked before the first positive electrode active material particles are cracked during a subsequent roll pressing process, thereby minimizing the cracking of the first positive electrode active material particles. In particular, when the cracking of the first positive electrode active material particles is minimized, an effect of suppressing gas generation during high temperature storage may be achieved.

In addition, when the second positive electrode active material particles fill the empty space between the first positive electrode active material particles, the empty space in the positive electrode active material layer may be minimized to improve energy density, and thus high capacity characteristics and output characteristics may be improved.

However, even when a mixed positive electrode material of two types of positive electrode active materials with different average particle diameters is used as the positive electrode material included in the positive electrode active material layer, a positive electrode material present in the upper part of the positive electrode active material layer may be cracked by a roll pressing process in the manufacture of the positive electrode.

According to the present invention, the large-particle-diameter first positive electrode active material having a relatively large average particle diameter ($D_{50}$) is in the form of a secondary particle formed by agglomerating at least several tens of primary particles. Since the first positive electrode active material is formed in the form of a secondary particle formed by agglomerating primary particles, a contact area between the first positive electrode active material and an electrolyte solution is increased, and the movement distance of lithium ions in the first positive electrode active material is reduced, thereby facilitating the realization of high capacity and high output characteristics.

The first positive electrode active material may be in the form of a secondary particle formed by agglomerating primary particles having crystalline grains with a size of 100 nm to 200 nm, and preferably, 100 nm to 150 nm. When the size of crystalline grains in the first positive electrode active material is within the above-described range, the resistance, capacity, and lifespan of a battery including the first positive electrode active material can be improved.

The primary particles of the first positive electrode active material may have an average particle diameter of 0.5 μm to 4.0 μm, preferably 1.0 μm to 3.0 μm, and more preferably 1.3 µm to 2.5 µm. When the average particle diameter of the primary particles of the first positive electrode active material is within the above-described range, the resistance, capacity, and lifespan of a battery including the first positive electrode active material can be improved.

In addition, the small-particle-diameter second positive electrode active material having a relatively small average particle diameter ($D_{50}$) is in the form of a single particle. Since the second positive electrode active material is formed in the form of a single particle, the second positive electrode active material may have excellent particle hardness despite having an average particle diameter ($D_{50}$) of 1 m or more and less than 8 µm, that is, a relatively small particle diameter. Accordingly, even when the second positive electrode active material is roll-pressed at a high force of 1,600 $kgf/cm^2$ to 2,000 $kgf/cm^2$, an increase in fine particles in the electrode due to the cracking of particles is alleviated, and thus the lifetime characteristics of a battery is improved.

Since the second positive electrode active material is formed in the form of a single particle, the movement distance of lithium ions in the second positive electrode active material is increased, and thus the mobility of lithium ions in the second positive electrode active material is decreased, thereby, when the second positive electrode active material is applied to a battery, output characteristics may be degraded.

The second positive electrode active material may be formed of primary particles having crystalline grains with a size of 100 nm to 250 nm, and preferably, 150 nm to 200 nm. When the size of crystalline grains in the second positive electrode active material is within the above-described range, the size of primary particles having crystalline grains can be relatively large, and primary particles with excellent particle hardness can be implemented.

Meanwhile, the second positive electrode active material is formed of relatively large primary particles compared to the first positive electrode active material. Specifically, the primary particles of the second positive electrode active material may have an average particle diameter of 1 µm or more and less than 8 µm, preferably 1 µm to 7 µm, and more preferably 1 µm to 4 µm. Since the second positive electrode active material is formed of several primary particles having a relatively large average particle diameter, it has excellent particle hardness compared to the first positive electrode active material.

Meanwhile, when the first positive electrode active material and the second positive electrode active material are included in a weight ratio of 9:1 to 6:4, and preferably, 8:2 to 7:3, an effect of improving energy density may be achieved, and the output characteristics of a battery may be improved while minimizing the cracking of particles.

The two types of positive electrode active materials with different average particle diameters may be included in an amount of 85 to 99 parts by weight, and preferably, 93 to 98 parts by weight with respect to the total weight (100 parts by weight) of the positive electrode active material layer. When the amount of the positive electrode material included in the positive electrode active material layer satisfies the above-described range, an effect of maximizing the energy density of a battery can be achieved. On the other hand, when the amount of the positive electrode material included in the positive electrode active material layer is less than the above-described range, energy density may be degraded, and thus capacity may be degraded. Also, when the amount of the positive electrode material included in the positive electrode active material layer exceeds the above-described range, a desired energy density may not be achieved, and thus capacity may be degraded due to degraded energy density.

In addition, the positive electrode active material layer 20 further includes a conductive material and a binder in addition to the two types of positive electrode active materials with different average particle diameters.

The conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as carbon black, acetylene black, Ketjen black, channel black, furnace black, lamp black, thermal black, carbon nanotubes, carbon fiber, or the like; a metal powder or metal fiber containing copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof. The conductive material may be included in an amount of 1 to 15 parts by weight, and preferably, 2 to 8 parts by weight with respect to the total weight (100 parts by weight) of the positive electrode active material layer. In particular, when carbon nanotubes are used as the conductive material, due to the high specific surface area of carbon nanotubes, the content of carbon nanotubes may be reduced compared to when other conductive materials are used. For example, when carbon nanotubes are used as the conductive material, the carbon nanotube conductive material may be included in an amount of 1 to 5 parts by weight, and preferably, 1 to 3 parts by weight with respect to the total weight (100 parts by weight) of the positive electrode active material layer.

The binder serves to improve cohesion between positive electrode active material particles and adhesion between the positive electrode active material and the current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, and various copolymers thereof, which may be used alone or in combination of two or more thereof. The binder may be included in an amount of 1 to 10 parts by weight, and preferably, 2 to 8 parts by weight with respect to the total weight (100 parts by weight) of the positive electrode active material layer.

In addition, the positive electrode according to the present invention includes the carbon nanotube coating layer 30 formed on the surface of the positive electrode active material layer 20, and the carbon nanotube coating layer includes carbon nanotubes and a binder.

As described above, when the positive electrode active material in the form of a single particle (second positive electrode active material according to the present invention) is included to suppress the cracking of the positive electrode active material layer, there is a problem such as degradation of output characteristics caused by the application of the positive electrode active material in the form of a single particle.

Accordingly, by forming the carbon nanotube coating layer with excellent conductivity on the surface of the positive electrode active material layer, a positive electrode which is capable of improving output characteristics by improvement of conductivity when applied to a battery may be provided.

For example, rather than the case in which a conductive layer is formed on the surface of the positive electrode active material layer, in the case in which the carbon nanotube coating layer is formed on the surface of first positive electrode active material particles and the surface of second positive electrode active material particles, which have a bimodal particle diameter distribution, it becomes difficult to completely suppress the cracking of the first positive electrode active material particles during roll pressing of the positive electrode due to the absence of a separate coating layer that acts as an impact-absorbing layer. Also, as the amount of carbon nanotubes included in the positive electrode active material layer increases, energy density is degraded, and thus output characteristics may be degraded.

The carbon nanotubes are highly crystalline carbon-based materials in the form of a tube made of hexagonally arranged carbon atoms and may serve to provide a path for reacting with lithium ions in the electrode due to having excellent electrical conductivity and excellent lithium ion conductivity. Therefore, the current and voltage distributions in the electrode during cycles of the charging and discharging are uniformly maintained, so that cycle characteristics may be substantially improved, and the output characteristics of a battery may also be substantially improved due to improved conductivity. In addition, the carbon nanotubes have tensile strength about 100 times higher than that of steel because carbon atoms are strongly covalently bonded to each other, and exhibit non-conductive, conductive, or semiconductive characteristics due to their unique chirality and high resistance to fracture. Therefore, it is possible to prevent the deformation of the current collector caused by repeated charging and discharging or external force and also prevent the surface of the current collector from being oxidized in an abnormal battery environment such as high temperature, overcharging, and the like, and thus battery stability may be substantially improved.

According to the present invention, the positive electrode active material layer and the carbon nanotube coating layer may be formed in a thickness ratio of 90:10 to 99:1, and preferably, 95:5 to 98:2.

When the positive electrode active material layer and the carbon nanotube coating layer are formed in the above-described thickness ratio range, electrical conductivity is improved, and accordingly, resistance characteristics are improved. Therefore, when they are applied to a battery, not only output can be maximized, but also the cracking of the positive electrode active material can be prevented. For example, when a proportion of the thickness of the carbon nanotube coating layer increases outside the above-described range, energy density may be decreased due to a decrease in proportion of the positive electrode active material in a battery.

In addition, the carbon nanotube coating layer further includes a binder.

The binder serves to improve cohesion between carbon nanotubes included in the carbon nanotube coating layer and adhesion between the carbon nanotube coating layer and the positive electrode active material layer. For example, when the carbon nanotube coating layer does not include the binder, the carbon nanotube coating layer may peel off from the surface of the positive electrode active material layer due to a force applied from the outside during a roll pressing process in the manufacture of the positive electrode or during charging and discharging of a secondary battery including the positive electrode. In this case, an effect of improving the output characteristics of a battery, which results from the formation of the carbon nanotube coating layer, may not be achieved, and the carbon nanotube coating layer may rather act as a resistive layer, thereby degrading the efficiency of a secondary battery. Since the type of the binder is the same as those described in the positive electrode active material layer, the detailed description thereof will be omitted.

The carbon nanotube coating layer may include the carbon nanotubes and the binder in a weight ratio of 80:20 to 95:5, and preferably, 90:10 to 95:5. When the carbon nanotubes and the binder are included within the above-described ranges, the carbon nanotube coating layer may not peel off during a roll pressing process in the manufacture of the positive electrode or during charging and discharging of a secondary battery including the positive electrode.

Method of Manufacturing Positive Electrode

The positive electrode may be manufactured by a typical method of manufacturing a positive electrode.

Specifically, a composition for forming a positive electrode active material layer, which is prepared by dissolving or dispersing two types of positive electrode active materials with different average particle diameters ($D_{50}$), a conductive material, and a binder in a solvent, is applied onto a positive electrode current collector and dried to form a positive electrode active material layer, and a composition for forming a coating layer, which is prepared by dissolving or dispersing a conductive material and a binder in a solvent, is applied onto the positive electrode active material layer and thermally treated, thereby manufacturing a positive electrode in which the positive electrode active material layer and the carbon nanotube coating layer are formed on the positive electrode current collector.

Meanwhile, the solvent may be a solvent generally used in the art, and examples of the solvent include dimethyl sulfoxide (DMSO), isopropyl alcohol, N-methyl pyrrolidone (NMP), acetone, water, and the like, which may be used alone or in combination of two or more thereof. The solvent is used in an amount just enough to dissolve or disperse the positive electrode active material, the conductive material, and the binder and to have a viscosity capable of achieving excellent thickness uniformity upon subsequent application for manufacturing the positive electrode in consideration of a thickness of an applied slurry and a manufacturing yield.

Lithium Secondary Battery

In the present invention, an electrochemical device including the positive electrode may be manufactured. The electrochemical device may specifically be a battery, a capacitor, or the like and more specifically a lithium secondary battery.

The lithium secondary battery specifically includes a positive electrode, a negative electrode disposed to face the positive electrode, a separator interposed between the positive electrode and the negative electrode, and an electrolyte. Since the positive electrode is the same as described above, the detailed description thereof will be omitted, and only the remaining components will be described in detail.

In addition, the lithium secondary battery may optionally further include: a battery container which accommodates an electrode assembly including the positive electrode, the negative electrode, and the separator; and a sealing member which seals the battery container.

In the lithium secondary battery, the negative electrode includes a negative electrode current collector and a negative electrode active material layer formed on the negative electrode current collector.

The negative electrode current collector is not particularly limited as long as it does not cause a chemical change in the battery and has high conductivity. For example, copper, stainless steel, aluminum, nickel, titanium, calcined carbon, copper or stainless steel whose surface has been treated with carbon, nickel, titanium, silver, or the like, an aluminum-cadmium alloy, or the like may be used as the negative electrode current collector. In addition, the negative electrode current collector may typically have a thickness of 3 μm to 500 μm and have fine irregularities formed on the surface thereof to increase the adhesion of a negative electrode active material like the positive electrode current collector. Additionally, the negative electrode current collector may be used in any of various forms such as a film, a sheet, a foil, a net, a porous material, a foam, a non-woven fabric, and the like.

The negative electrode active material layer includes a negative electrode active material and, optionally, a binder and a conductive material.

As the negative electrode active material, a compound that enables the reversible intercalation and deintercalation of lithium may be used. Specific examples of the negative electrode active material include: a carbonaceous material such as artificial graphite, natural graphite, graphitized carbon fiber, amorphous carbon, or the like; a metallic compound capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_\beta$ ($0<\beta<2$), $SnO_2$, vanadium oxide, or lithium vanadium oxide; and a composite including the metallic compound and the carbonaceous material, such as a Si—C composite or a Sn—C composite, which may be used alone or in combination of two or more thereof. In addition, a lithium metal thin film may be used as the negative electrode active material. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes, and the like.

The negative electrode active material may be included in an amount of 80 parts by weight to 99 parts by weight with respect to the total weight (100 parts by weight) of the negative electrode active material layer.

The binder serves to assist bonding between the conductive material, the active material, and the current collector and is typically included in an amount of 0.1 parts by weight to 10 parts by weight with respect to the total weight (100 parts by weight) of the negative electrode active material layer. Examples of the binder include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber, nitrile butadiene rubber, fluorine rubber, and various copolymers thereof.

The conductive material is a component for improving the conductivity of the negative electrode active material and may be included in an amount of 10 parts by weight or less, and preferably, 5 parts by weight or less with respect to the total weight (100 parts by weight) of the negative electrode active material layer. Such a conductive material is not particularly limited as long as it does not cause a chemical change in the battery and has conductivity. For example, graphite such as natural graphite, artificial graphite, or the like; carbon black such as acetylene black, Ketjen black, channel black, furnace black, lamp black, thermal black, or the like; a conductive fiber such as a carbon fiber, a metal fiber, or the like; a metal powder containing carbon fluoride, aluminum, nickel, or the like; a conductive whisker such as zinc oxide, potassium titanate, or the like; a conductive metal oxide such as titanium oxide or the like; or a conductive material such as a polyphenylene derivative or the like may be used.

For example, the negative electrode active material layer may be formed by applying, onto a negative electrode current collector, a negative electrode mixture, which is prepared by dissolving or dispersing a negative electrode active material and, optionally, a binder and a conductive material in a solvent, and drying the same, or by laminating, on a negative electrode current collector, a film obtained by casting the negative electrode mixture on a separate support and removing it from the support.

Meanwhile, in the lithium secondary battery, the separator serves to separate the negative electrode and the positive electrode and provide a passage for lithium ion migration. As the separator, any separator that is typically used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a typical porous non-woven fabric, for example, a non-woven fabric made of high-melting-point glass fiber, polyethylene terephthalate fiber, or the like may be used. Also, to ensure heat resistance or mechanical strength, a coated separator which includes a ceramic component or polymer material and is optionally in a single-layer or multi-layer structure may be used.

In addition, as the electrolyte used in the present invention, an organic liquid electrolyte, an inorganic liquid electrolyte, a solid polymer electrolyte, a gel-type polymer electrolyte, an inorganic solid electrolyte, a molten-type inorganic electrolyte, or the like, which is usable in the manufacture of the lithium secondary battery, may be used, but the present invention is not limited thereto.

Specifically, the electrolyte may include an organic solvent and a lithium salt.

As the organic solvent, any solvent that may function as a medium through which ions involved in an electrochemical reaction of the battery can migrate may be used without particular limitation. Specifically, the organic solvent may be: an ester-based solvent such as methyl acetate, ethyl acetate, γ-butyrolactone, F-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte performance may be exhibited.

As the lithium salt, any compound that may provide lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt is preferably used at a concentration of 0.1 to 2.0 M. When the concentration of the lithium salt is within the above-described range, the electrolyte has appropriate levels of conductivity and viscosity, and thus excellent electrolyte performance can be exhibited, and lithium ions can effectively migrate.

In addition to the above-described electrolyte components, the electrolyte may further include at least one additive selected from a haloalkylene carbonate-based compound such as difluoroethylene carbonate and the like, pyridine, triethylphosphite, triethanolamine, cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like for the purpose of improving the lifetime characteristics of the battery, suppressing a reduction in battery capacity, improving the discharge capacity of the battery, or the like. In this case, the additive may be included in an amount of 0.1 to 5 parts by weight with respect to the total weight (100 parts by weight) of the electrolyte.

Since the lithium secondary battery including the positive electrode active material according to the present invention stably exhibits excellent discharge capacity, output characteristics, and lifetime characteristics as described above, it is useful in the field of portable devices such as mobile phones, notebook computers, digital cameras, and the like and electric vehicles such as hybrid electric vehicles (HEVs) and the like.

Accordingly, the present invention also provides a battery module including the lithium secondary battery as a unit cell and a battery pack including the battery module.

The battery module or battery pack may be used as a power source for one or more medium-to-large-sized devices selected from a power tool; electric vehicles (EVs), hybrid electric vehicles, and plug-in hybrid electric vehicles (PHEVs); and a system for storing electric power.

The type of the lithium secondary battery according to the present invention may be, but is not particularly limited to, a cylindrical type using a can, a prismatic type, a pouch type, a coin type, or the like The lithium secondary battery according to the present invention may be used not only in a battery cell used as a power source of a small device but also as a unit battery in medium-to-large-sized battery modules including a plurality of battery cells.

Hereinafter, the present invention will be described in detail with reference to embodiments. However, embodiments of the present invention may be modified into several different forms, and the scope of the present invention is not limited to the embodiments to be described below. The embodiments of the present invention are provided so that this disclosure will be thorough and complete, and will fully convey the concept of embodiments to those skilled in the art.

EXAMPLES

Example 1

$Li_{1.02}Ni_{0.80}Co_{0.10}Mn_{0.1}O_2$, which has an average particle diameter ($D_{50}$) of 15 μm and is in the form of a secondary particle formed by agglomerating primary particles (average particle diameter: 1.5 m) having crystalline grains with a size of 120 nm to 150 nm, as a first positive electrode active material and $Li_{1.04}Ni_{0.80}Co_{0.10}Mn_{0.1}O_2$, which has an average particle diameter ($D_{50}$) of 6 μm and is in the form of a single particle formed of at most ten primary particles having crystalline grains with a size of 150 nm to 200 nm, as a second positive electrode active material were mixed in a weight ratio of 80:20, and the resulting mixture was used as a positive electrode material.

Meanwhile, the mixed positive electrode material, carbon nanotubes as a conductive material, and polyvinylidene fluoride (PVDF, KF1100) as a binder were mixed in a weight ratio of 97.5:1:1.5, and the resulting mixture was added to an N-methyl pyrrolidone (NMP) solvent to prepare a composition for forming a positive electrode. The composition for forming a positive electrode was applied onto a 20 μm-thick aluminum foil using a coating device (blade coater) and then dried to form a positive electrode active material layer having a thickness of 90 μm on a surface of the positive electrode current collector (Al foil).

Meanwhile, a PVDF binder was added to a carbon nanotube dispersion solution, which was prepared by dispersing carbon nanotubes in an NMP solvent, so that a weight ratio of the carbon nanotubes and the PVDF binder was 95:5 to prepare a composition for forming a coating layer. The composition for forming a coating layer was applied onto a surface of the positive electrode active material layer and then thermally treated at 130° C. under an air atmosphere to manufacture a positive electrode including a 3 μm-thick carbon nanotube coating layer formed on the surface of the positive electrode active material layer.

Example 2

A positive electrode was manufactured in the same manner as in Example 1 except that a 10 μm-thick carbon nanotube coating layer was formed on a surface of a positive electrode active material layer by adjusting an interval between a coating device and a current collector.

Comparative Example 1

A positive electrode was manufactured in the same manner as in Example 1 except that a carbon nanotube coating layer was not formed on a surface of a positive electrode active material layer.

Comparative Example 2

A positive electrode was manufactured in the same manner as in Example 1 except that a composition for forming a coating layer, which was prepared by dispersing only carbon nanotubes in an NMP solvent, was used.

Comparative Example 3

A positive electrode active material layer was formed in the same manner as in Example 1 except that a composition for forming a positive electrode, which was prepared by mixing the positive electrode material prepared in Example 1, carbon black as a conductive material, and a PVDF binder in a weight ratio of 96.5:1.5:2 and adding the resulting mixture to an NMP solvent, was used.

In addition, a positive electrode was manufactured in the same manner as in Example 1 except that a coating layer using carbon black was formed on the positive electrode active material layer instead of the carbon nanotube coating layer of Example 1.

Comparative Example 4

A carbon nanotube dispersion solution was prepared by dispersing carbon nanotubes in a solvent.

A first positive electrode active material whose surface was coated with carbon nanotubes was prepared by adding the carbon nanotube dispersion solution in an amount of 1.5 parts by weight with respect to 100 parts by weight of the first positive electrode active material.

In addition, a second positive electrode active material whose surface was coated with carbon nanotubes was prepared by adding the carbon nanotube dispersion solution in an amount of 1.5 parts by weight with respect to 100 parts by weight of the second positive electrode active material.

A positive electrode was manufactured in the same manner as in Example 1 except that the prepared first positive electrode active material and the prepared second positive electrode active material were mixed in a weight ratio of 80:20 to form a positive electrode active material layer, and a carbon nanotube coating layer was not formed on a surface of the positive electrode active material layer.

Comparative Example 5

A positive electrode was manufactured in the same manner as in Example 1 except that $Li_{1.04}Ni_{0.80}Co_{0.10}Mn_{0.1}O_2$, which has an average particle diameter ($D_{50}$) of 6 μm and is in the form of a secondary particle, was used as a second positive electrode active material.

Experimental Example 1: Confirmation of Occurrence of Cracking During Roll Pressing The positive electrodes manufactured in Examples 1 and 2 and Comparative Examples 1 to 5 were roll-pressed with a rolling force of 1,600 kgf/cm², and then characteristics thereof were confirmed using a scanning electron microscope.

Figure 2A:
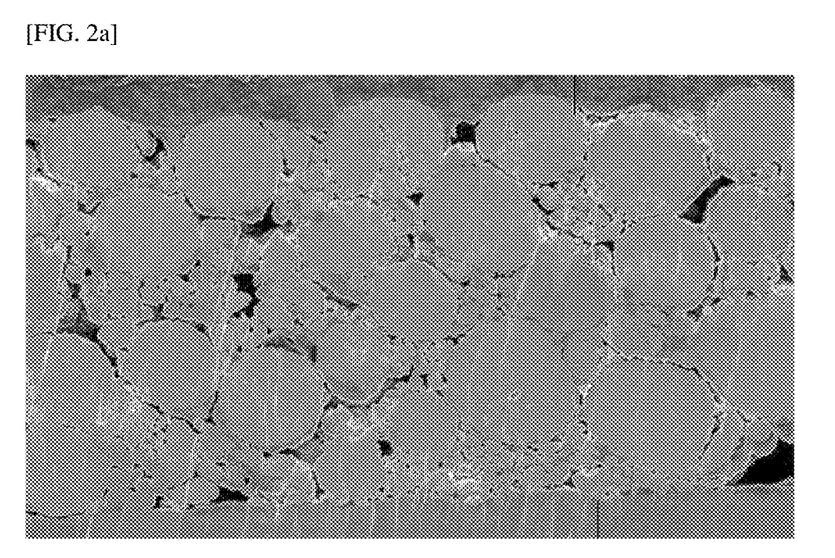
FIGS. 2A and 2B are scanning electron microscope (SEM) images of a cross section of a positive electrode manufactured in Example 1.
Figure 2B:
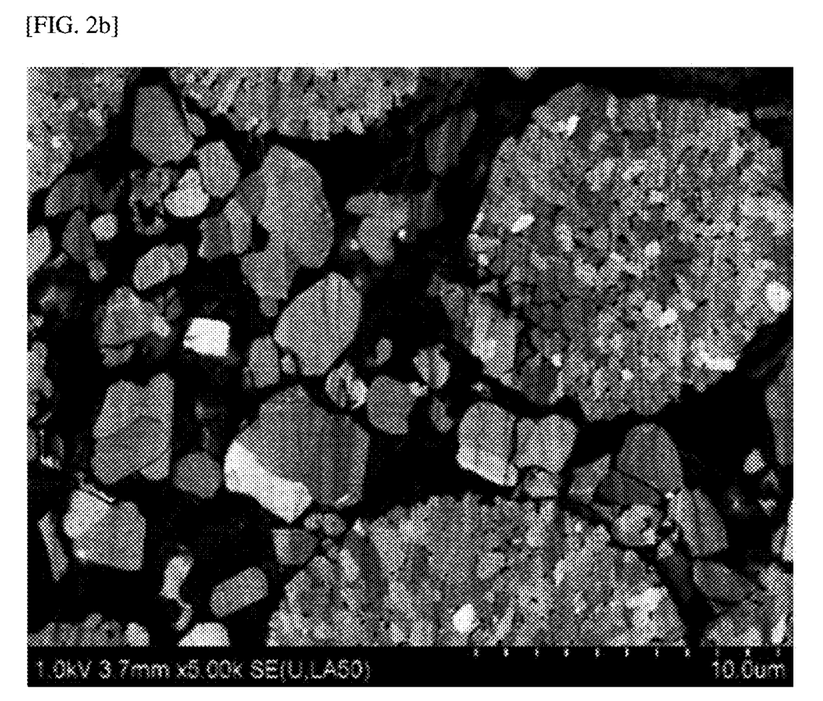
Figure 3:
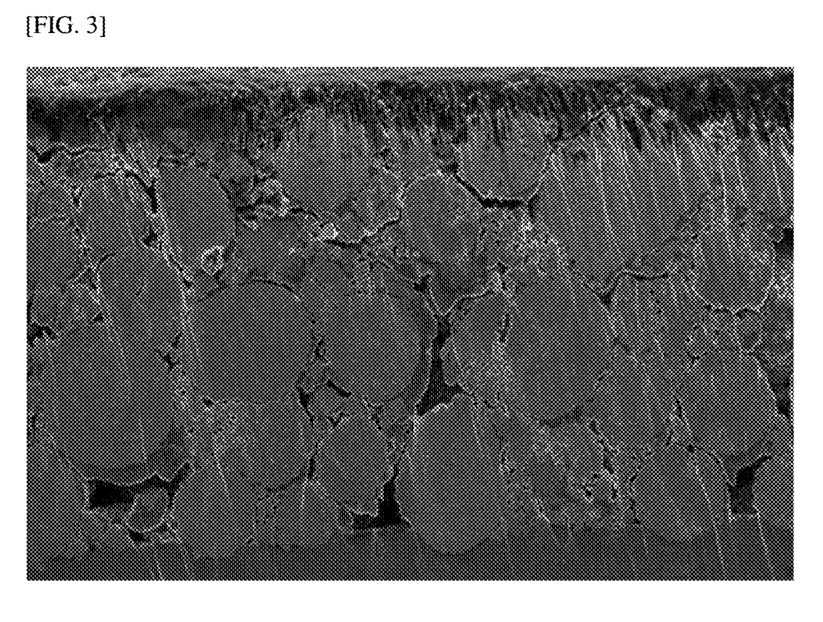
FIG. 3 is an SEM image of a cross section of a positive electrode manufactured in Example 2.
Figure 4:
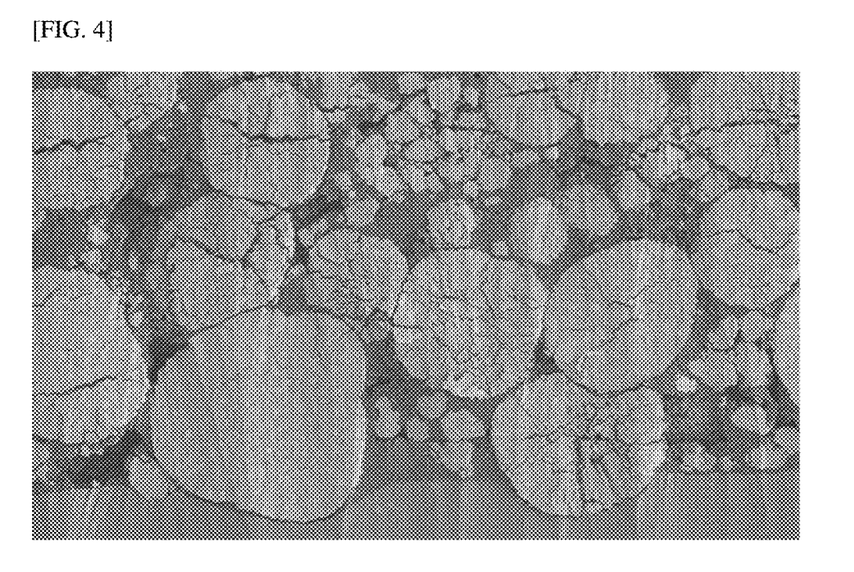
FIG. 4 is an SEM image of a cross section of a positive electrode manufactured in Comparative Example 1.
Figure 5A:
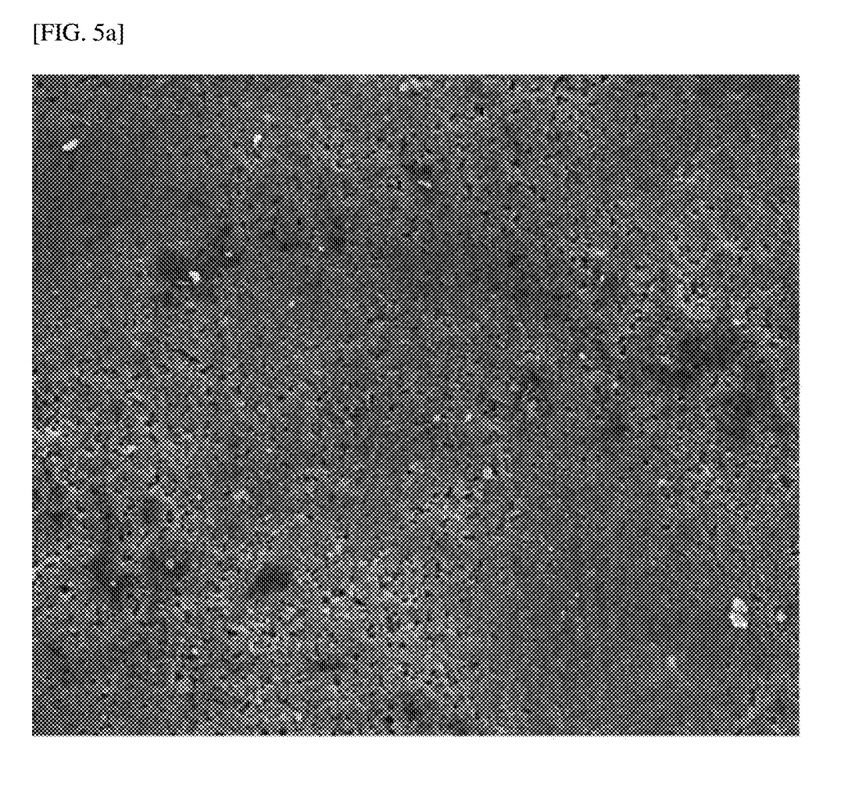
FIG. 5A is an SEM image of a surface of a positive electrode manufactured in Example 1.

FIGS. 2A and 2B are scanning electron microscope (SEM) images of the cross section of particles after the positive electrode manufactured in Example 1 was roll-pressed with the above-described rolling force, and FIGS. 3, 4, and 6 to 8 are SEM images of the cross section of particles after the positive electrodes manufactured in Example 2 and Comparative Examples 1 and 3 to 5 were roll-pressed with the above-described rolling force, respectively. Also, FIGS. 5A and 5B are SEM images of the surface of the positive electrodes manufactured in Example 1 and Comparative Example 2, respectively.

Figure 7:
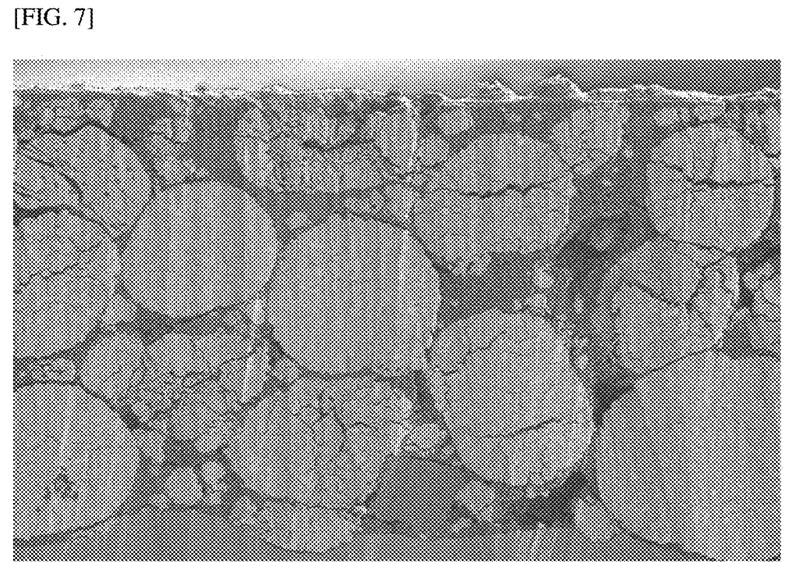
FIG. 7 is an SEM image of a cross section of a positive electrode manufactured in Comparative Example 4.
Figure 8:
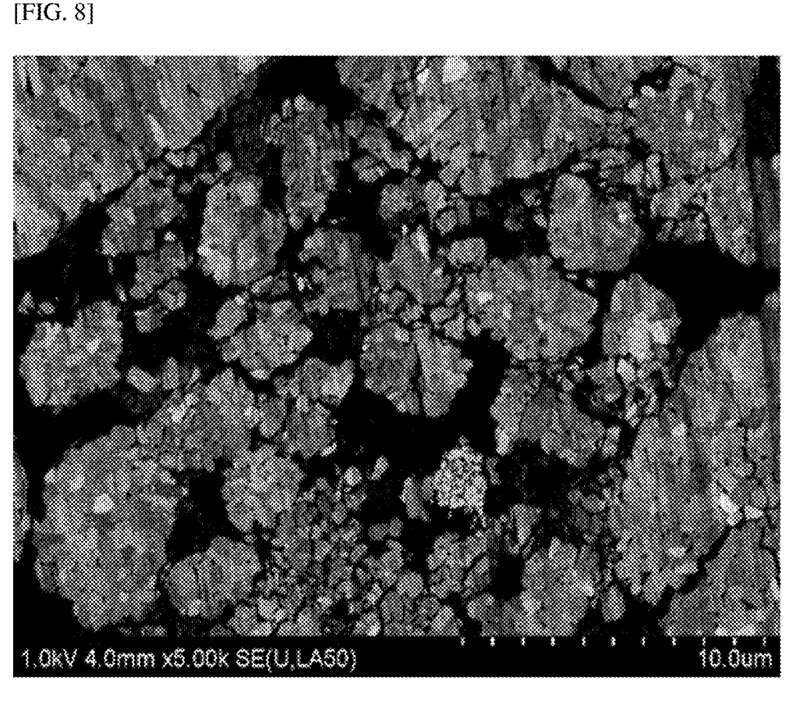
FIG. 8 is an SEM image of a cross section of a positive electrode manufactured in Comparative Example 5.

First, referring to FIGS. 2A, 2B, and 3, it can be seen that even when the positive electrodes manufactured in Examples 1 and 2 were roll-pressed with a rolling force of 1,600 kgf/cm², the positive electrode active material with a bimodal particle diameter distribution was not cracked. Referring to FIGS. 4 and 7, it can be seen that when the positive electrodes manufactured in Comparative Examples 1 and 4 were roll-pressed, the positive electrode active material having a relatively large particle diameter was cracked. Referring to FIG. 8, it can be seen that since the positive electrode manufactured in Comparative Example 5 included the positive electrode active material which has a small particle diameter and is in the form of a secondary particle, not a single particle, the positive electrode active material having a small particle diameter was cracked.

Figure 6:
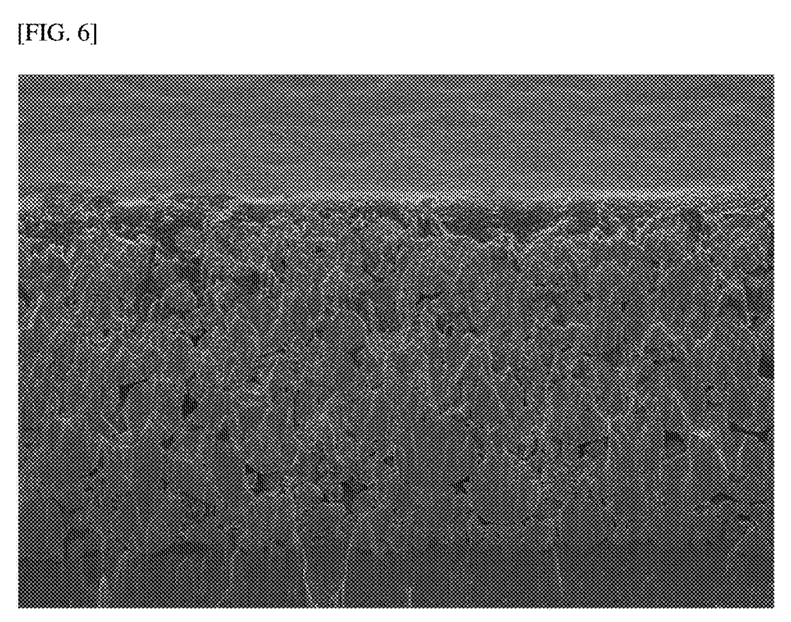
FIG. 6 is an SEM image of a cross section of a positive electrode manufactured in Comparative Example 3.

Referring to FIG. 6, it can be seen that even when a carbon-based coating layer was formed on the surface, the cracking of the positive electrode active material was suppressed.

Figure 5B:
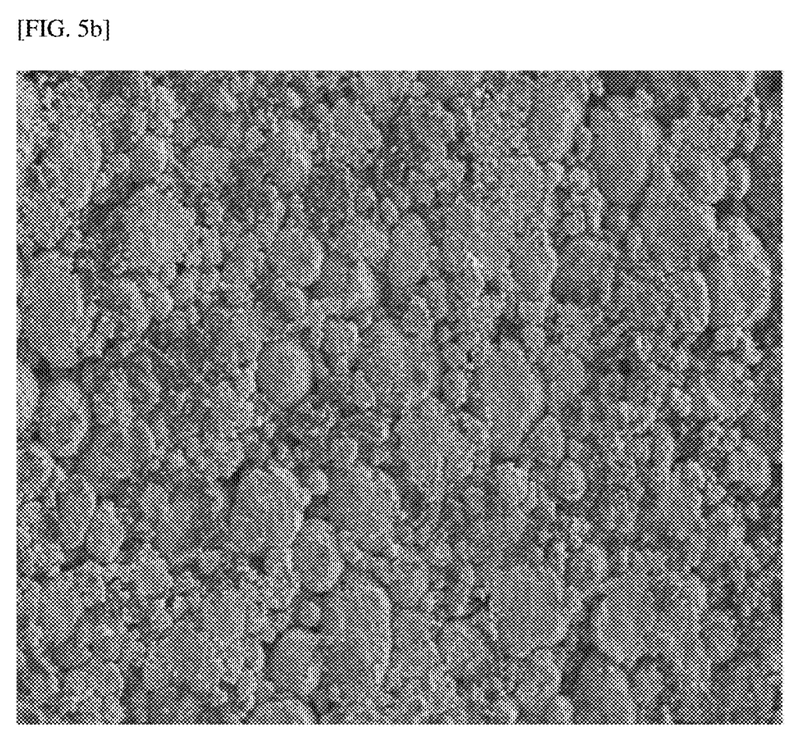
FIG. 5B is an SEM image of a surface of a positive electrode manufactured in Comparative Example 2.

Referring to FIG. 5B, it can be seen that after the positive electrode manufactured in Comparative Example 2 was roll-pressed with a rolling force of 1,600 kgf/cm², the positive electrode active material was observed. That is, after the positive electrode manufactured in Comparative Example 2 was roll-pressed, the carbon nanotube coating layer peeled off from the surface of the positive electrode active material layer, and thus the positive electrode active material was observed in the surface SEM image. On the other hand, as shown in FIG. 5A, even when the positive electrode manufactured in Example 1 was roll-pressed with the same rolling force, the carbon nanotube coating layer did not peel off, and thus it was not possible to observe the positive electrode active material in the surface SEM image.

Experimental Example 2: Confirmation of Output Characteristics

A lithium secondary battery was manufactured using each of the positive electrodes manufactured in Examples 1 and 2 and Comparative Examples 1 to 4, and output characteristics thereof were confirmed. In this case, the lithium secondary battery was manufactured in the same manner as follows, except that each of the positive electrodes manufactured in Examples 1 and 2 and Comparative Examples 1 to 4 was used.

Specifically, a graphite-based negative electrode active material, carbon black (Super C65) as a conductive material, and carboxymethylcellulose (CMC, Daicel 2200) as a binder were mixed in a weight ratio of 96.5:1.5:2, and the resulting mixture was added to water as a solvent to prepare a negative electrode active material slurry. The negative electrode active material slurry was applied onto a 10 m-thick copper foil, dried, and then roll-pressed to manufacture a negative electrode. A battery was manufactured by laminating each of the positive electrodes manufactured in Examples 1 and 2 and Comparative Examples 1 to 4 and the manufactured negative electrode together with a ceramic-coated polyethylene separator using a typical method. Then, the battery was input into a battery case, and an electrolyte solution prepared by dissolving 0.7 M LiPF$_6$ and 0.3 M LiFSI in a 3:7 mixed solvent of ethylene carbonate and ethyl methyl carbonate (EC:EMC) was injected thereto, thereby manufacturing lithium secondary batteries according to Examples 1 and 2 and Comparative Examples 1 to 4.

Each of the lithium secondary batteries according to Examples 1 and 2 and Comparative Examples 1 to 4 was charged at 25° C. and a constant current of 0.2 C until 4.2 V was reached and then discharged at a constant current of 0.2 C until 2.5 V was reached, and the capacity of the battery was measured. Afterward, the battery was recharged at a constant current of 0.2 C until 4.2 V was reached and then discharged at a constant current of 0.2 C until 50% of the preceding discharge capacity was reached, and a current was applied at 2.5 C for 30 seconds. At this time, initial resistance was measured by dividing voltage values before and after the current application by current values. In addition, the battery was charged at 45° C. and a constant current of 1 C until 4.2 V was reached under a condition of 0.005 C cut off and then discharged at a constant current of 1 C until 2.5 V was reached, and 400 cycles of the charging and discharging were performed. At this time, a resistance increase rate was calculated as a percentage relative to the $1^{st}$ cycle, and results thereof are shown in the following Table 1.

TABLE 1

|  | Initial resistance (mΩ) | Resistance increase rate at $400^{th}$ cycle (%) |
|---|---|---|
| Example 1 | 1.42 | 234 |
| Example 2 | 1.40 | 225 |
| Comparative Example 1 | 1.58 | 254 |
| Comparative Example 2 | 1.56 | 246 |
| Comparative Example 3 | 1.45 | 232 |
| Comparative Example 4 | 1.54 | 250 |

As shown in Table 1, it can be seen that the secondary batteries according to Examples 1 and 2 exhibited improved initial resistance and an improved resistance increase rate compared to the secondary batteries according to Comparative Examples 1, 2, and 4. Therefore, it can be predicted that the secondary batteries according to Comparative Examples 1, 2, and 4 exhibited inferior output characteristics compared to the secondary batteries according to Examples 1 and 2.

Meanwhile, since the secondary battery according to Comparative Example 3 exhibited a resistance increase rate within a similar range to that of the present invention, but initial resistance thereof was higher than those of the secondary batteries according to Examples 1 and 2 of the present invention, it can be predicted that resistance (mΩ) after 400 cycles also was higher than those of the secondary batteries according to Examples 1 and 2. Also, it can be seen that although the total amount of a conductive material (carbon black) included in the positive electrode according to Comparative Example 3 was about 1.5 times larger than the total amount of carbon nanotubes included in each of the positive electrodes according to Examples 1 and 2, resistance characteristics were inferior compared to Examples 1 and 2.

LIST OF REFERENCE NUMERALS

10: positive electrode current collector
20: positive electrode active material layer
30: carbon-based coating layer

The invention claimed is:

1. A positive electrode comprising:
a positive electrode active material layer on a surface of a positive electrode current collector, where the positive electrode active material layer includes two types of positive electrode active materials with different average particle diameters ($D_{50}$), a conductive material, and a binder; and
a carbon nanotube coating layer on a surface of the positive electrode active material layer, wherein the carbon nanotube coating layer includes carbon nanotubes and a binder,
wherein the two types of positive electrode active materials with different average particle diameters have a bimodal particle diameter distribution, in which first positive electrode active material particles have an average particle diameter ($D_{50}$) of 8 µm to 20 µm and second positive electrode active material particles in the form of a single particle have an average particle diameter ($D_{50}$) of 3 µm to 6 µm,
wherein a thickness ratio of the positive electrode active material layer and the carbon nanotube coating layer is 90:10 to 99:1,
wherein the single particle is at least one of a non-agglomerated primary particle and a secondary particle formed of 10 or less primary particles,
wherein the primary particle is a smallest particle unit observable through scanning electron microscopy,
wherein the second positive electrode active material has crystalline grains with a size of greater than 150 nm to 250 nm, and
wherein the first positive electrode active material has crystalline grains with a size of 120 nm to 150 nm.

2. The positive electrode of claim 1, wherein the carbon nanotube coating layer includes the carbon nanotubes and the binder in a weight ratio of 80:20 to 95:5.

3. The positive electrode of claim 1, wherein the first positive electrode active material and the second positive electrode active material are each independently represented by the following Chemical Formula 1:

[Chemical Formula 1]

$Li_{1+a}Ni_xCo_yM_zO_2$ wherein, $0 \leq a \leq 0.5$, $0<x<1$, $0<y<1$, $0<z<1$, and M is at least one of Mn and Al.

4. The positive electrode of claim 1, wherein the first positive electrode active material includes primary particles having an average particle diameter of 0.5 µm to 4 µm.

5. The positive electrode of claim 1, wherein the first positive electrode active material and the second positive electrode active material are included in a weight ratio of 9:1 to 6:4.

6. A lithium secondary battery comprising the positive electrode according to claim 1.

* * * * *